A. BLAKESLEE.
ANIMAL TRAP.
APPLICATION FILED APR. 26, 1915. RENEWED JAN. 3, 1917.
1,218,514. Patented Mar. 6, 1917.
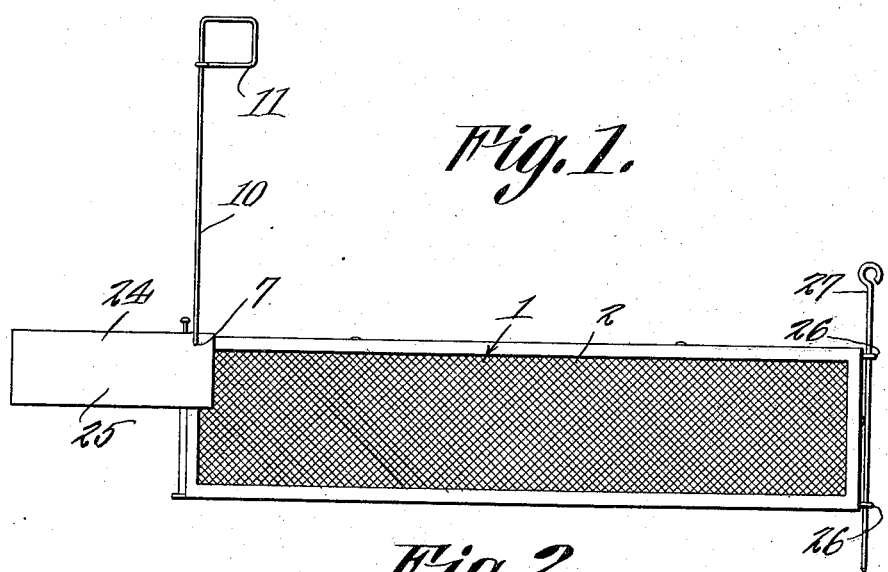
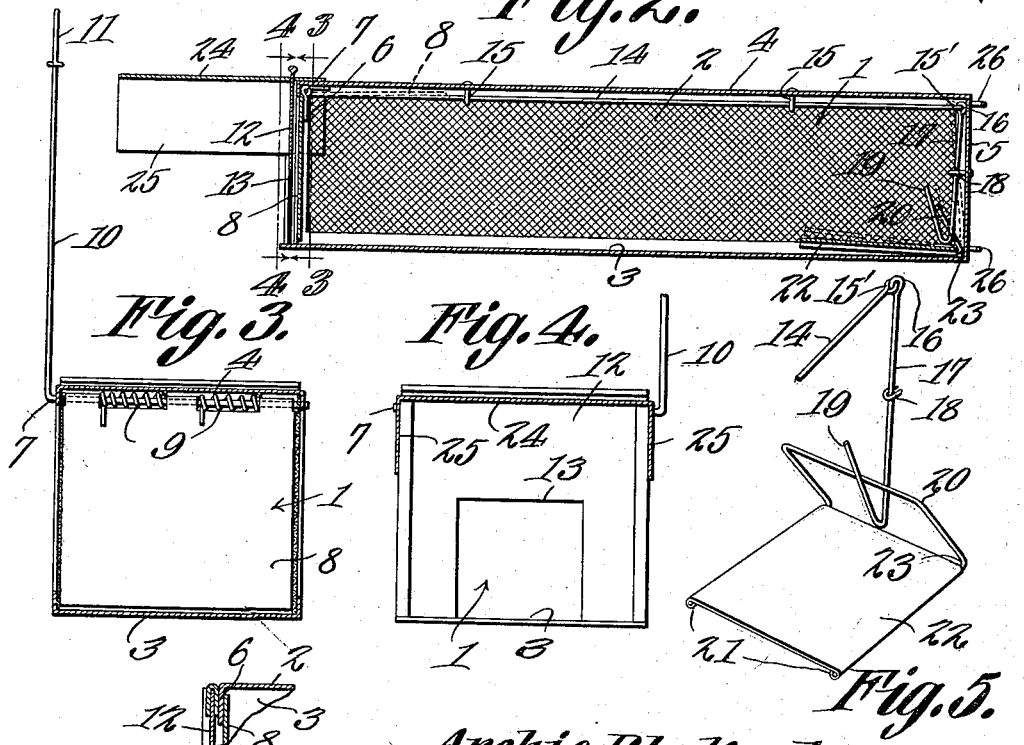
Witnesses
Archie Blakeslee, Inventor,
by C. A. Snow & Co.
Attorneys

UNITED STATES PATENT OFFICE.

ARCHIE BLAKESLEE, OF TIONESTA, PENNSYLVANIA.

ANIMAL-TRAP.

1,218,514.  Specification of Letters Patent.  Patented Mar. 6, 1917.

Application filed April 26, 1915, Serial No. 24,076. Renewed January 3, 1917. Serial No. 140,470.

*To all whom it may concern:*

Be it known that I, ARCHIE BLAKESLEE, a citizen of the United States, residing at Tionesta, in the county of Forest and State of Pennsylvania, have invented a new and useful Animal-Trap, of which the following is a specification.

The present invention relates to improvements in animal traps, one object of the invention, being the provision of a trap adapted for catching without injury various rodents or fur bearing animals, the same being provided with a means for indicating from a distant point whether the trap has been actuated, so that the trapper in making his "rounds" of the traps will not necessarily have to visit each trap individually to ascertain whether or not the same has been sprung.

A further object of the present invention, is the provision of a trap of this character in which the spring actuated door is held elevated by a novel treadle actuated means so that the present device may be manipulated into set positions without endangering the trapper.

A still further object of the invention, is the provision of an auxiliary door adapted to be used in connection with the present device so that animals of various sizes may be excluded from the trap so that a particular sized animal may be caught therein.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a side elevation of the complete trap in the position it assumes when the door is sprung.

Fig. 2 is a longitudinal sectional view through the same showing in dotted lines the position of the door when set.

Fig. 3 is a section taken on line 3—3 of Fig. 2.

Fig. 4 is a section taken on line 4—4 of Fig. 2.

Fig. 5 is a perspective view of the treadle and base holding the member in its operable relation.

Fig. 6 is a detailed sectional view through one corner of the trap.

Referring to the drawings, the reference numeral 1 designates the captivity chamber of the present trap, which is provided with the two oppositely disposed longitudinal mesh walls 2 with the solid bottom 3 and the solid top 4 and with the solid rear wall 5. The forward wall 6 is composed of two vertical plates adapted to limit the movement of the door 8 in its closed position and also to constitute a guide for the auxiliary member 12, which is provided with the opening 13, there being a number of these members 12 furnished with each trap so that various sized openings 13 may be provided to thus permit the passage therethrough of the desired sized animal to be caught.

Pivoted for swinging movement by means of the rod 7 at the upper forward end at the front of the present captivity chamber, is a door 8, which is provided with springs 9 to normally hold the same in closed position, the carrying member 7 being provided with the arm 10, which extends upwardly and acts as a lever for actuating the door to dotted line position as shown in Fig. 2 and also carried upon its free end, the signal device 11, which indicates when in its uppermost position, that the trap is sprung.

In order to provide a means for locking the door in the dotted or elevated position as shown in Fig. 2, there is disposed for longitudinal reciprocation, the rods 14, said rods 14 being held adjacent the under side of the top 4 by means of the guiding staples 15 so that the forward end thereof may be disposed below the lower edge of the door 6 to thus maintain the same in the elevated or "set" position. The opposite end of the rod 14 is provided with an eye 15′ which is connected to the eye 16, of the rod 17. The rod 17 is fulcrumed intermediate of its ends to the staple 18 carried by the rear wall 5 of the captivity chamber and with the base and trip treadle engaging hook 19. This treadle engaging hook 19 is so disposed as to receive the bail 20, which is composed of a single piece of wire and is bent so that the terminals 21 will carry the treadle 22 with the angled members 23 at the fulcrum point of the treadle when in the position as shown in Fig. 2.

When the present trap is used to entrap animals having burrows, the guiding member 24 is attached to the top thereof, so that the wings 25 will depend downwardly and thus confine the device so that the inlet end of the trap will be adjacent the opening of the pen, thus insuring the passage of the animal into the captivity chamber.

In order to hold the trap in position so that the same will not be moved accidentally, either by the animal or by the elements, two staples 26 are attached to the rear wall thereof so that the spike 27 may be employed to be driven in the ground.

When the trap is in set position or as shown in Fig. 2, the fulcrum point 23 of the treadle will rest upon the floor of the trap so that the forward end thereof will be above the floor, with the bail member 20 engaging the hook 19 below the bait carried thereby. Thus, when the rodent enters the trap, and moves to the rear thereof, to detect the bait, he is forced to stand upon the treadle 22, at which time, the same acting as a lever with the point 23 the fulcrum will move the hook 19 forwardly and consequently pull upon the rod 14 to release the same from the door 16 to the action of the springs 9. Thus, the door will be snapped closed and the rodent captured.

Should the rodent be of a type that the law prevents from capture, the present trap will retain the same so that when the trapper makes the rounds of the trap, the door 6 may be elevated and the rodent be permitted to escape.

By using the auxiliary member 12, various sized rodents may be caught by the present trap as the opening 13 will regulate the size that is permitted to pass within the captivity chamber.

What is claimed is:

1. An animal trap, including a captivity chamber open at one end, a trap door controlling said open end, said trap door being opened inwardly, a longitudinally slidable trigger rod suspended from the top of the chamber and extending to the rear end thereof, the forward end thereof being in the path to engage and hold the door open, a lever carrying a bait hook pivoted intermediate of its ends to the rear wall of the chamber, said lever having its upper end connected to the trigger rod, and a treadle mounted at the rear of the captivity chamber and having means for engaging the bait hook, whereby the depression of the treadle operates the lever to withdraw the rod and release the door.

2. An animal trap, including a captivity chamber open at one end, a trap door controlling said open end, said trap door being opened inwardly, a longitudinally slidable trigger rod suspended from the top of the chamber and extending to the rear end thereof, the forward end thereof being in the path to engage and hold the door open, a lever carrying a bait hook pivoted intermediate of its ends to the rear wall of the chamber, said lever having its upper end connected to the trigger rod, and an auxiliary door provided with a rodent receiving opening mounted in the forward end of the chamber to control the area or passage way to the captivity chamber.

3. An animal trap, including a captivity chamber open at one end, an L-shaped rod having the short terminal thereof journaled transversely of and at the upper forward corner of the captivity chamber, with the long terminal extending upwardly and constituting a lever and signal member, a trap door connected to the rod for controlling said open end of the captivity chamber, a spring mounted upon the short terminal of the rod and controlling the door to hold the door closed, a longitudinally slidable trigger rod suspended from the top of the chamber and extending to the rear end thereof, the forward end of the rod being disposed in the path to engage the lower free end of the door when the door is opened, and a lever carrying a bait hook pivoted intermediate of its ends to the rear wall of the chamber and having its upper end connected to the trigger rod.

4. An animal trap, including a captivity chamber open at one end, an L-shaped rod having the short terminal thereof journaled transversely of and at the upper forward corner of the captivity chamber, with the long terminal extending upwardly and constituting a lever and signal member, a trap door connected to the rod for controlling said open end of the captivity chamber, a spring mounted upon the short terminal of the rod, and controlling the door to hold the door closed, a longitudinally slidable trigger rod suspended from the top of the chamber and extending to the rear end thereof, the forward end of the rod being disposed in the path to engage the lower free end of the door when the door is opened, a lever carrying a bait hook pivoted intermediate of its ends to the rear wall of the chamber and having its upper end connected to the trigger rod, and a treadle mounted at the rear of the captivity chamber and having means for engaging the bait hook, whereby the depression of the treadle will operate the lever to withdraw the rod and release the door.

In testimony that I claim the foregoing as my own, I have hereto affixed my signature in the presence of two witnesses.

ARCHIE BLAKESLEE.

Witnesses:
A. C. BROWN,
C. A. LANSON.

Copies of this patent may be obtained for five cents each, by addressing the "Commissioner of Patents, Washington, D. C."